(12) United States Patent
Lange

(10) Patent No.: US 7,988,132 B2
(45) Date of Patent: *Aug. 2, 2011

(54) BLOCK WITH IMPROVED CENTRAL MOUNTING

(75) Inventor: Kenneth Edward Lange, Brookfield, WI (US)

(73) Assignee: Harken, Inc., Pewaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,467

(22) Filed: Mar. 9, 2010

(65) Prior Publication Data

US 2010/0219389 A1 Sep. 2, 2010

Related U.S. Application Data

(63) Continuation of application No. 12/210,935, filed on Sep. 15, 2008, now Pat. No. 7,673,851.

(51) Int. Cl.
*B66D 3/04* (2006.01)

(52) U.S. Cl. ........ 254/409; 254/412; 254/416; 254/401; 254/402; 254/405; 254/408

(58) Field of Classification Search ............. 254/390, 254/392, 401, 402, 405, 408, 412–416
See application file for complete search history.

(56) References Cited

U.S. PATENT DOCUMENTS

| 230,994 | A | * | 8/1880 | Bitting | 384/276 |
| 352,539 | A | * | 11/1886 | Handy | 254/412 |
| 360,050 | A | * | 3/1887 | Redmond | 254/412 |
| 1,406,560 | A | * | 2/1922 | Houghton | 254/406 |
| 5,249,543 | A | * | 10/1993 | Rutgerson et al. | 114/108 |
| 5,511,447 | A | * | 4/1996 | Galloway et al. | 74/577 S |
| 5,538,224 | A | * | 7/1996 | Powell et al. | 254/406 |
| 5,984,278 | A | * | 11/1999 | Hartlmeier | 254/415 |
| 6,305,669 | B1 | * | 10/2001 | Harken et al. | 254/412 |
| 6,684,805 | B2 | * | 2/2004 | Curchod | 114/218 |
| 7,594,642 | B2 | * | 9/2009 | Curchod | 254/390 |

* cited by examiner

*Primary Examiner* — Emmanuel M Marcelo
(74) *Attorney, Agent, or Firm* — Alan R. Stewart; Godfrey & Kahn, S.C.

(57) ABSTRACT

A block with a rotating sheave mounted between a pair of side plates. Between the side plates may be a post about which a mounting loop may be mounted. The post is configured to permit the loop to be attached or detached from the block.

7 Claims, 8 Drawing Sheets

BLOCK WITH IMPROVED CENTRAL MOUNTING

RELATED APPLICATION

The present application is a continuation of U.S. patent application Ser. No. 12/210,935, filed on Sep. 15, 2008 now U.S. Pat. No. 7,673,851, the disclosure of which is incorporated herein by reference.

BACKGROUND

The present disclosure relates to a block, for example, a block for use in directing lines on a sailboat, with an improved mounting arrangement.

When mounting line handling blocks on sailboats, it has become conventional to provide for attachment of the blocks by straps or loops of line. These strap or looping mounting arrangements permit reduction of the weight in the standing and running rigging of the boat and provide greater flexibility in mounting the blocks. When a strap or line loop mounting is used in place of a more traditional metal shackle, the weight of the block and mounting arrangement combination may be reduced and other advantages such as improved safety for sailors or equipment may also result. While the improvements achieved with strap or line loop mounting have been considerable, additional improvements to such alternative mounting arrangements have been achieved through the use of the line loop mounting system described herein.

DESCRIPTION

Figure 1:
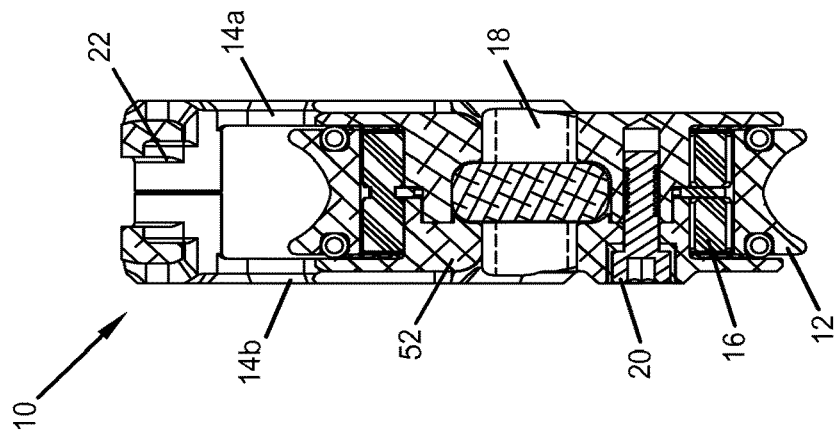
FIG. 1 is a side view of a block according to the present disclosure.
Figure 2:
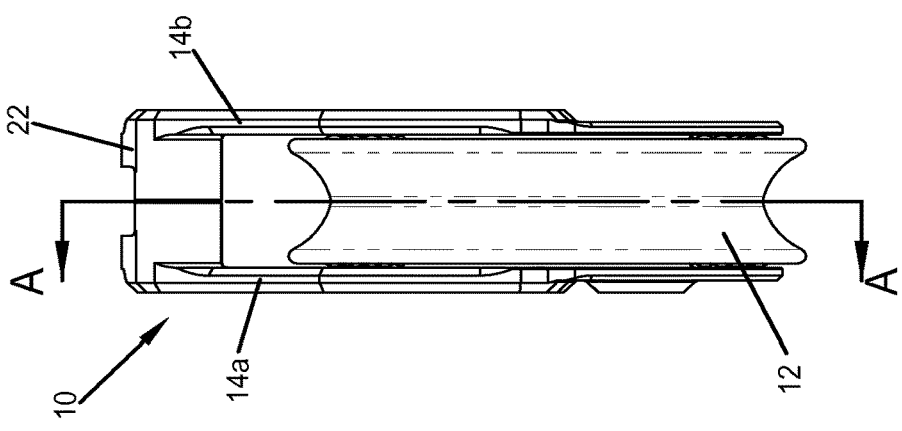
FIG. 2 is an end view of the block of FIG. 1.
Figure 3:
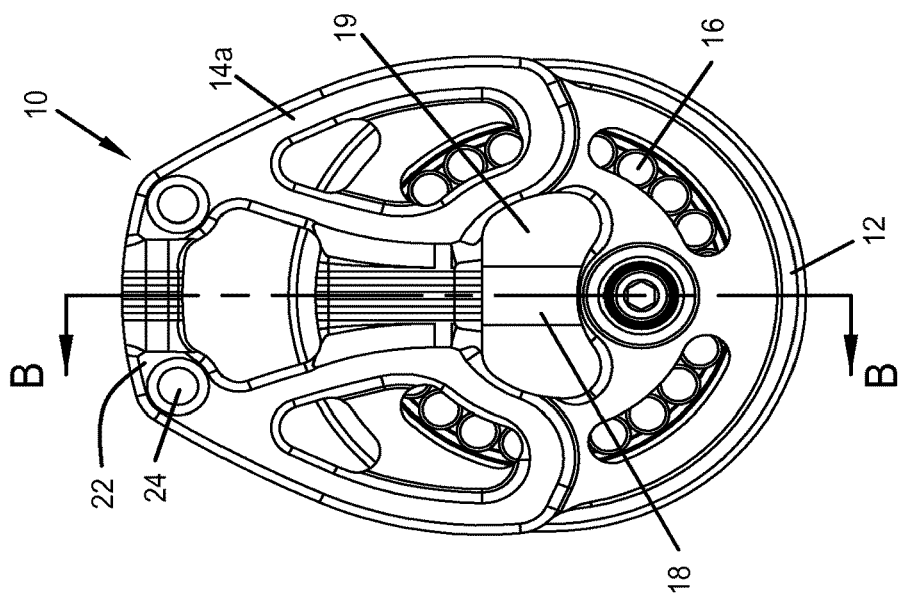
FIG. 3 is an end cross-sectional view of the block of FIG. 1, taken along line B-B in FIG. 1.
Figure 4:
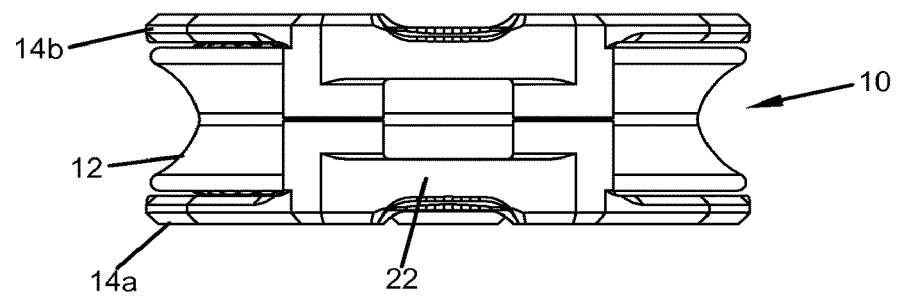
FIG. 4 is a view of the head end of the block of FIG. 1.
Figure 5:
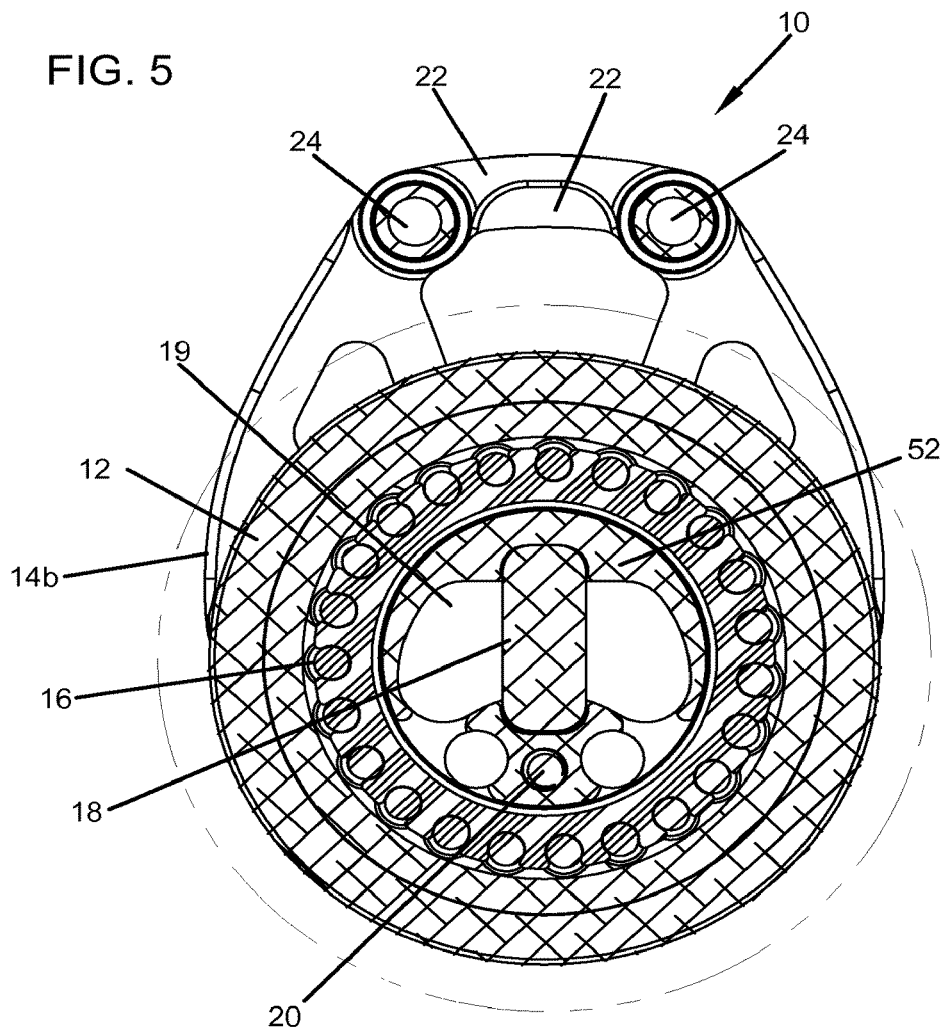
FIG. 5 is a side cross-sectional view of the block of FIG. 1, taken along line A-A in FIG. 2.

FIGS. 1 to 5 illustrates a block 10 according to the present disclosure with a sheave 12 mounted within a pair of side plates 14a and 14b and suspended rotatably by bearings such as roller bearings 16. It is anticipated that other types of bearings such as but not limited to ball or needle bearings may also be used within the scope of the present disclosure. Within a central opening 50 (shown in FIG. 6) of sheave 10 between side plates 14a and 14b is a post 18. A releasable fastener such as a screw or bolt 20 allows one of the side plates 14 to be removed from block 10 to provide for access to and removal of post 18. Post 18 is removably positioned between side plates 14 within sheave 12 and is centrally located within an opening 19 extending through both sides of the block. Opening 19 is sized and configured to permit a line to pass around all sides of post 18.

Block 10 also includes a head end 22 defined by a portion of side plates 14 which provides preferably at least a pair of lashing openings 24. Sheave 12 and bearings 16 may be preferably mounted or assembled in conjunction with one of the side plates 14 such as side plate 14b with the other side plate 14a configured to be removable from the rest of block 10 with the removal of bolt 20. Thus, a side plate 14 may be removed from block 10 to permit access to openings 19 and post 18 without additional disassembly of the block.

Figure 6:
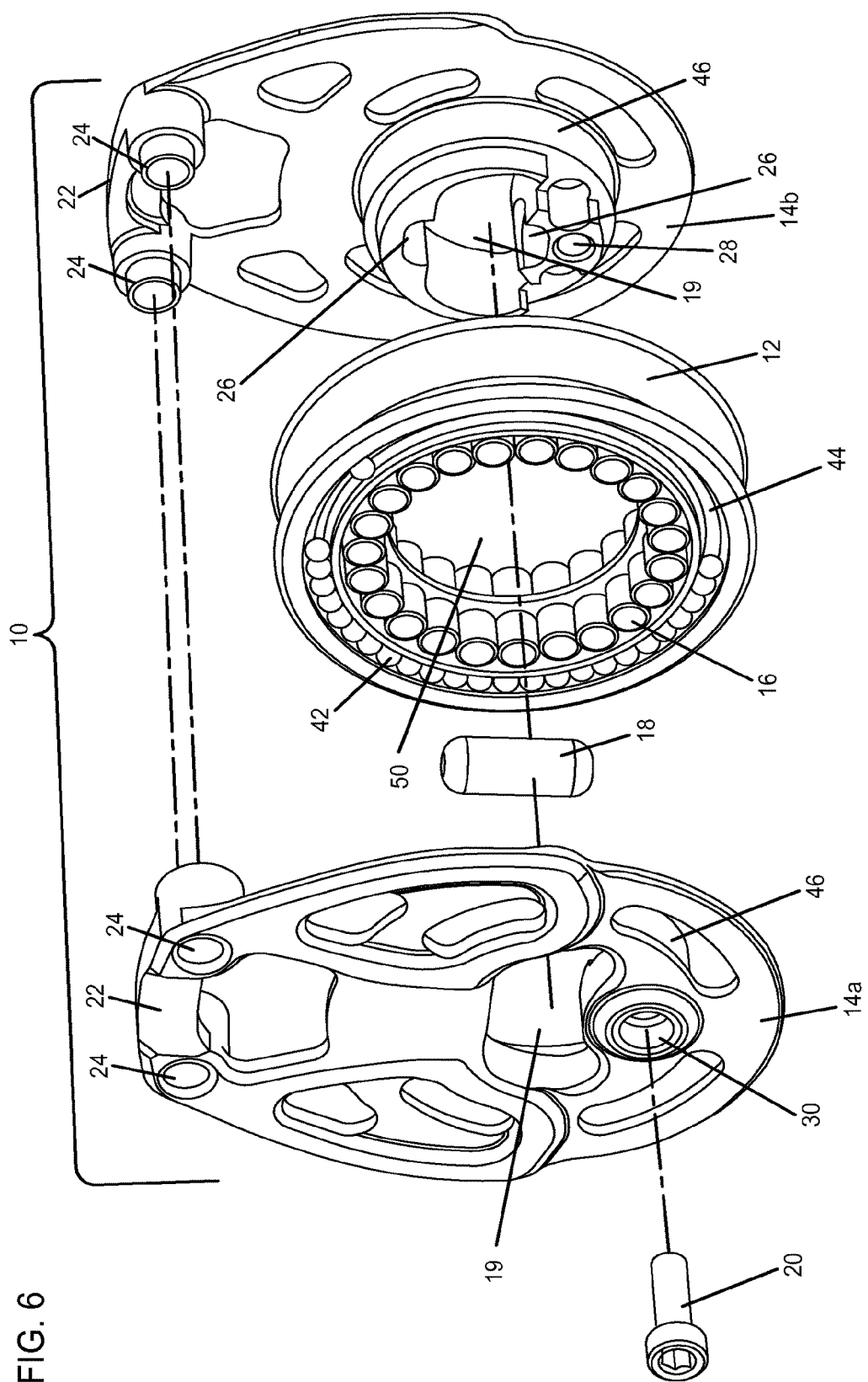
FIG. 6 is a perspective exploded view of the block of FIG. 1.

Referring now to FIG. 6, block 10 includes first removable side plate 14a and second fixed side plate 14b. Both side plates 14a and 14b include an opening 19 through which a line loop may pass and within which post 18 is removably mounted. Within each opening 19 of the side plates are a pair of opposing recesses 26 within which post 18 is received and held captive when the plates are held together by bolt 20. Bolt 20 extends through an opening 30 in plate 14a and is threadably received within an opening 28 in plate 14b to releasably hold the plates together. Recesses 26 cooperate to secure post 18 is a desired orientation, in this case generally vertically oriented within the block. Other orientations of post 18 may also be provided by altering the location of recesses 26 and possibly also the shape of openings 19.

Also included on an interior surface of side plates 14 are sheave bearing structure halves 46 and 48 which cooperate to form a sheave bearing support 52 which is received within a central opening 50 of sheave 12. The sheave bearing support (shown in FIGS. 3 and 5) provides a surface for bearings 16 to engage and rotatably support sheave 12 within block 10.

Along an outer surface of either side of sheave 12 may be formed a recess 44 to serve as a bearing race for bearings such as balls 42 positioned to provide lateral support to sheave 12 against side plates 14a and 14b. Bearings 42 may be balls, roller, needle or other bearings as appropriate for the size of block 10, and the magnitude and/or direction of load to be applied to the block. Such alternative bearings are within the scope of the present disclosure.

Figure 7:
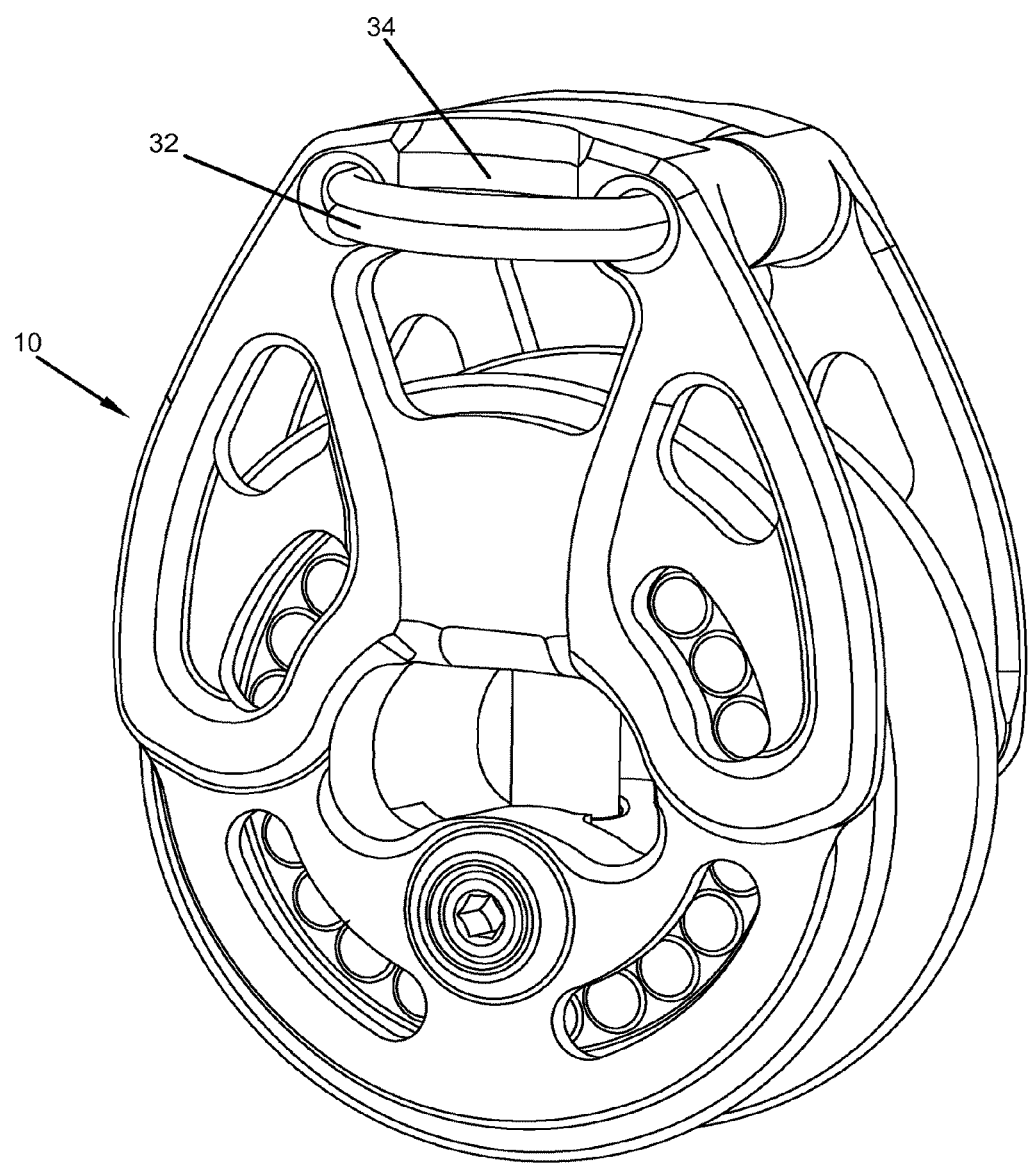
FIG. 7 is a perspective view of the block of FIG. 1, with a lashing line positioned within openings of the head of the block.

Referring now to FIG. 7, block 10 may include a lashing line 32 positioned through openings 24 in head 22 of the block. The purpose of line 32 is to hold a mounting line loop engaging post 18 within a pair of opposing recesses 34 on either side of head 22. This ensures that the block may be oriented as desired with the head to one side and the sheave on an opposite side toward the direction where the line passing over the sheave may originate and toward the direction the line may desirably extend. Other suitable approaches to releasably retaining the mounting line loop adjacent head 22 may be used within the scope of the present disclosure.

Figure 8:
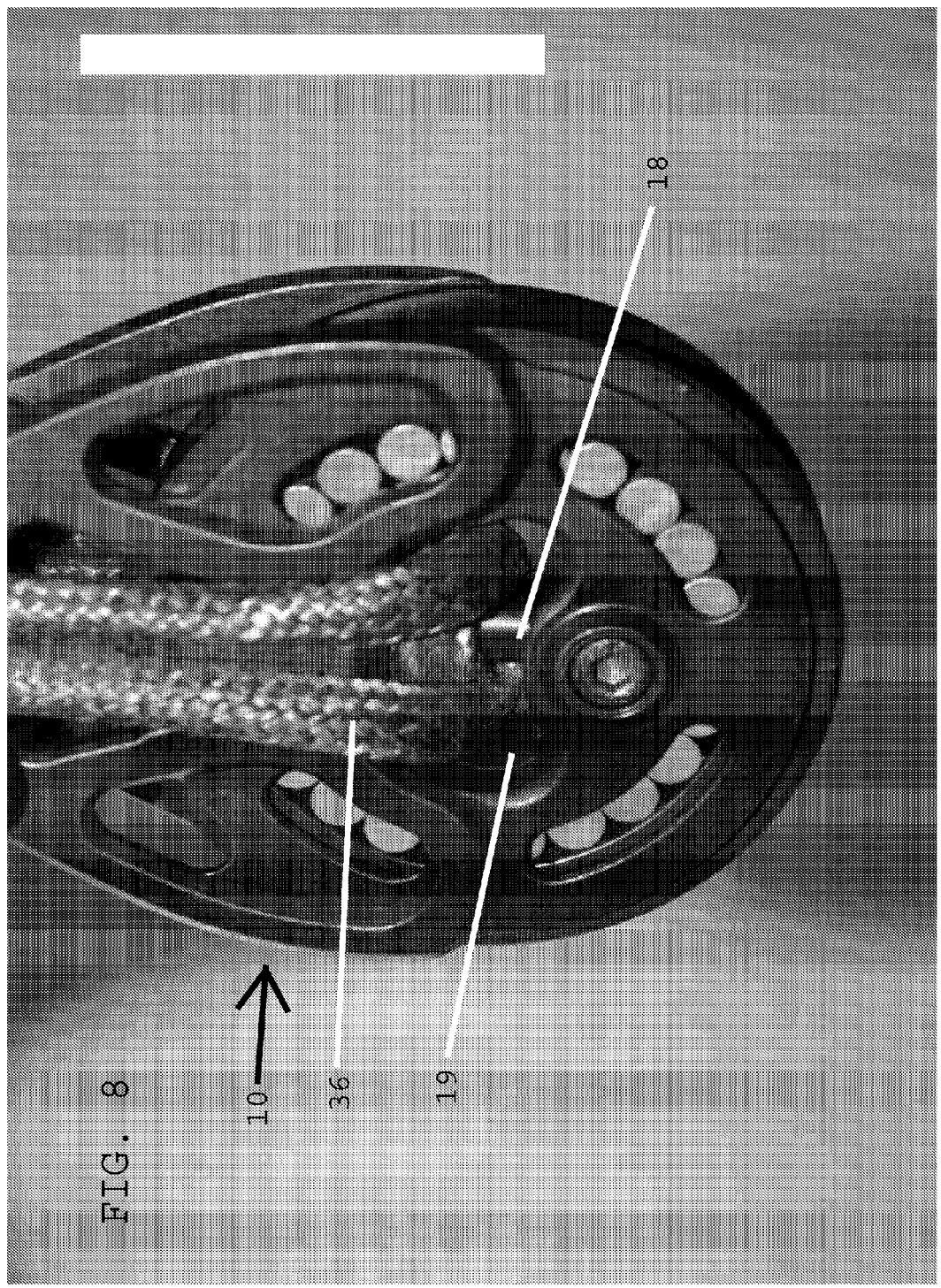
FIG. 8 is a photograph of the block of FIG. 1, with a mounting line loop passing through a central opening of the block within a sheave and also passing about a post positioned within the opening.
Figure 9:
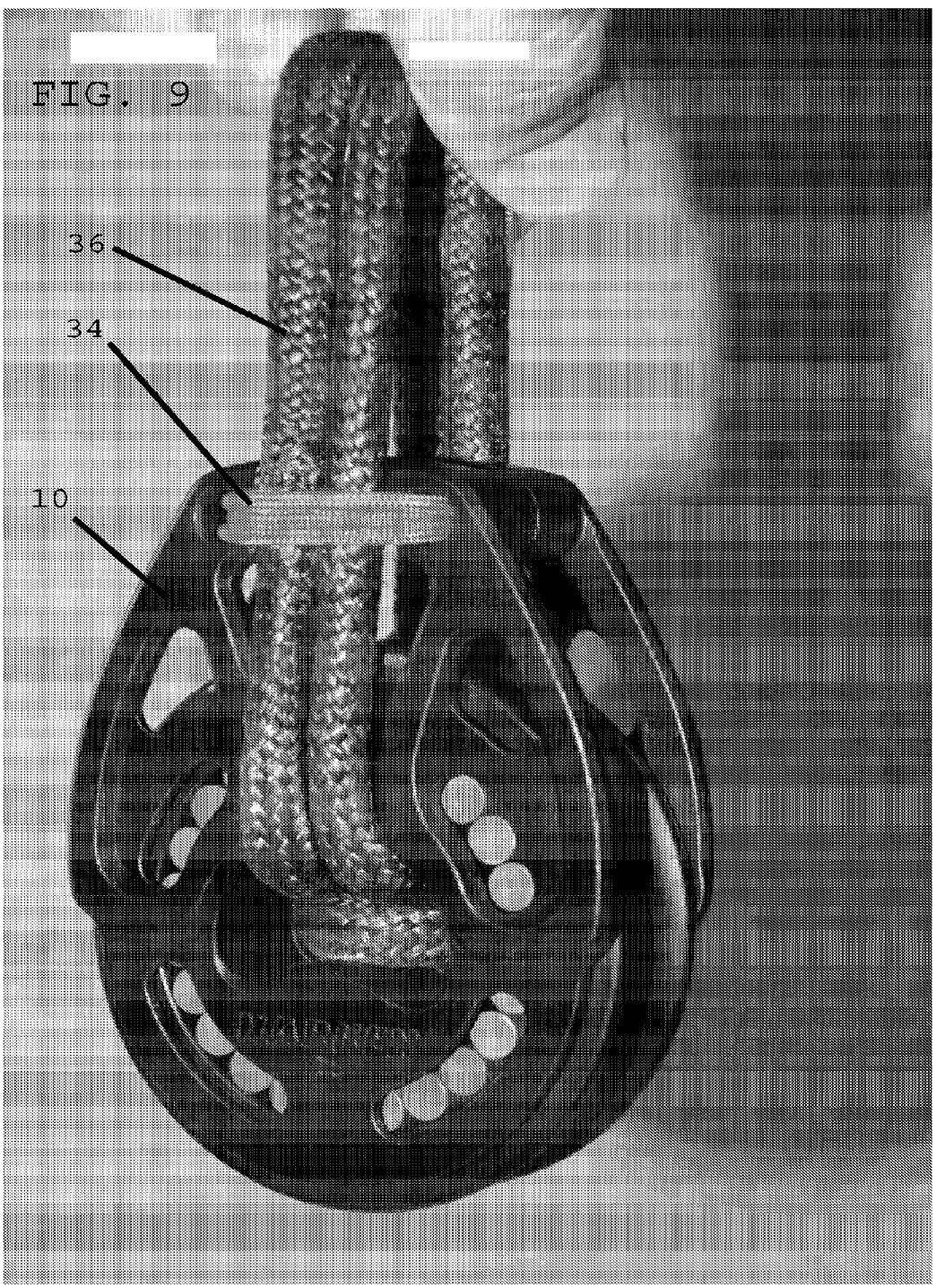
FIG. 9 is a photograph of the block of FIG. 1, with the lashing line holding the mounting line adjacent the side plates and passing adjacent the head of the block.
Figure 10:
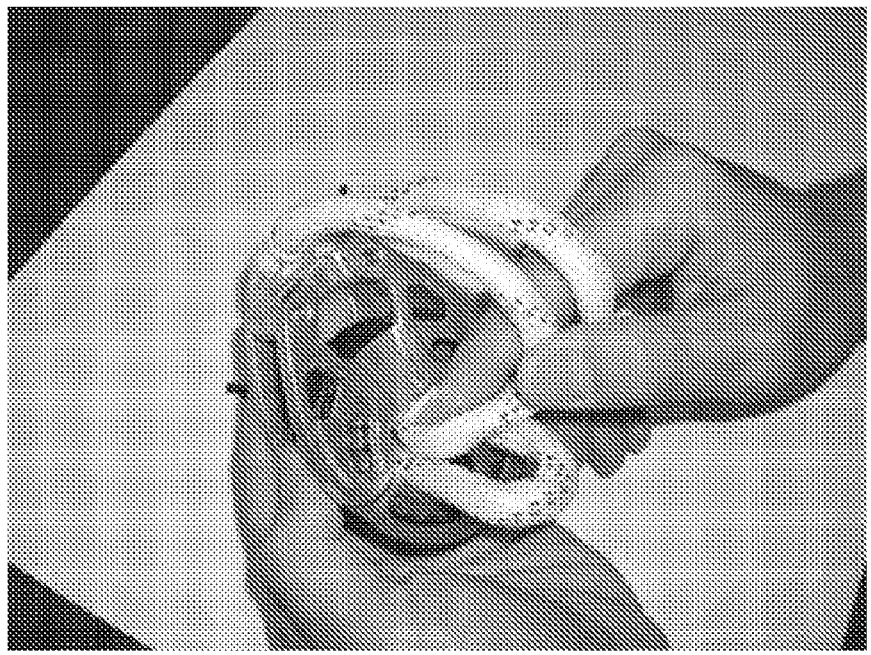
FIGS. 10 to 13 are a series of photographs illustrating a process for positioning a line loop about the post within the central opening of the block of FIG. 1.
Figure 11:
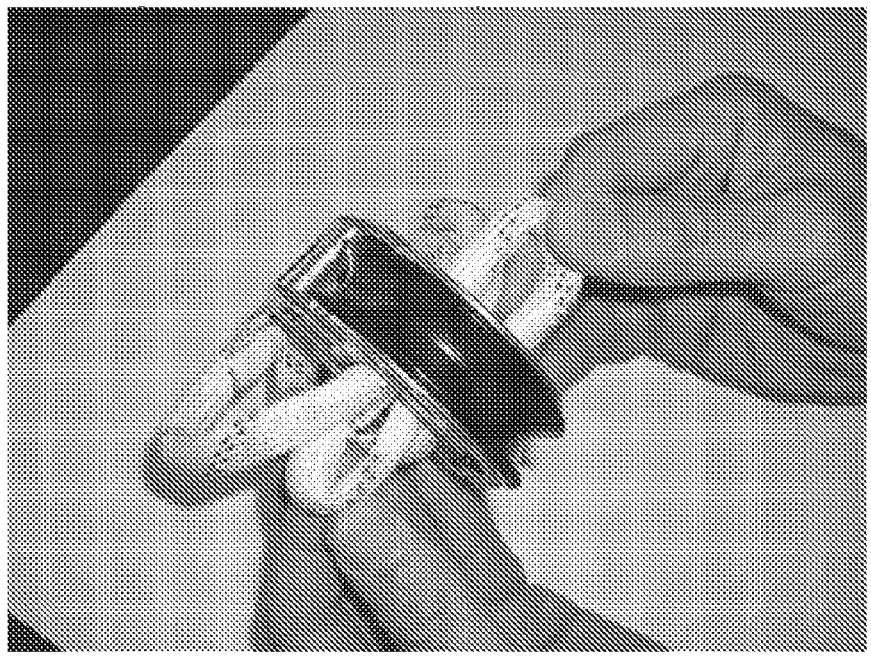
Figure 12:
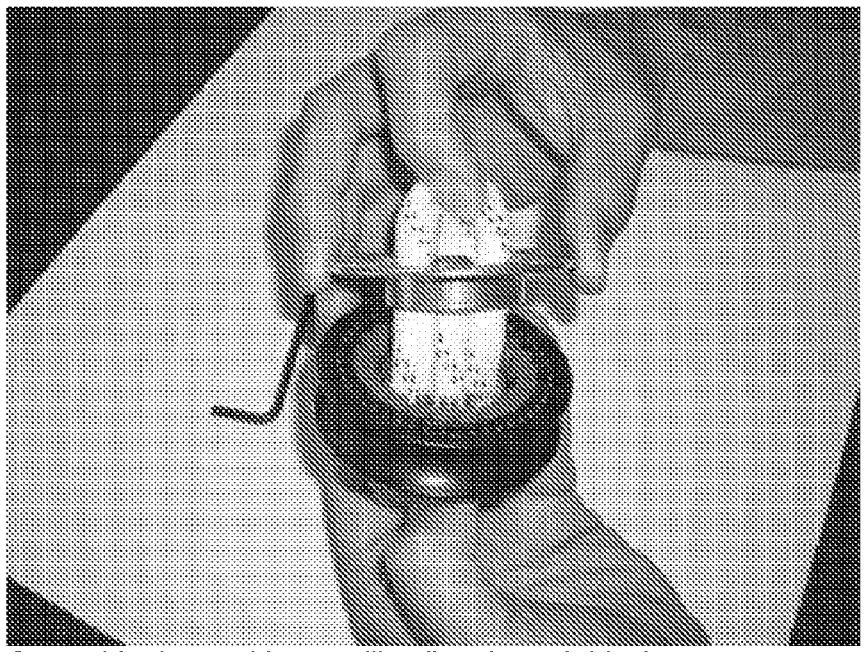
Figure 13:

FIGS. 8 and 9 illustrate block 10 with a mounting line loop 36 passing through opening 19 and about post 18 through both sides of the block. As line loop 36 extends past head 22 of the block, lashing line 32 holds portions of the line loop within the opposing recesses 34.

FIGS. 10 to 13 illustrate a process for positioning line loop 36 within block 10 through opening 19 and about post 18. Line loop 36 is a continuous loop of line such might be formed by splicing or otherwise joining the opposite ends of a desirable length of line. A bight or end loop is formed in opposite ends of line loop 36 and those loops are extended through opening 19 from opposite sides of block 10 when post 18 has been removed from the block. Once the opposing end loops are passed through opening 19, side plate 14a is removed from block 10 enough to permit the insertion of post 18 within opening 19 and within the end loops of line loop 36. Side plate 14a is then repositioned on block 10 and secured to block 10 with bolt 20. Once line loop 36 is captive about post 18, lashing lines may be passed about the line loop through openings 24 in head 22 to secure the line loop within recesses 34. The block and mounting line loop assembly is now ready for use.

The foregoing description is intended to be merely illustrative of the concept embodied in the present disclosure and is not intended to limit the scope of the disclosure. It is anticipated that additional embodiments may be developed within the scope of the present disclosure.

What is claimed is:

1. A block for use with a line, the block comprising:
   a sheave defining a central opening;
   a pair of side plates positioned on either side of the sheave, each side plate defining an opening corresponding to the central opening of the sheave;
   a post positioned within the openings of the side plates and within the central opening of the sheave;
   a mounting loop line with opposite ends;
   each opening of the side plates configured to receive one of the ends of the mounting line loop and permit the line to be positioned about the post with both ends extending within the central opening of the sheave;
   wherein one of the ends of the mounting line loop extends through one of the side plates and the opposite end of the mounting line loop extends through the other side plate.

2. The block of claim 1, the side plates cooperating to define a sheave bearing support about their respective openings, the sheave being rotatably supported on the sheave bearing support with a plurality of bearings between the sheave bearing support and the central opening of the sheave.

3. The block of claim 2, wherein the plurality of bearings positioned between the sheave and the sheave bearing support are roller bearings.

4. The block of claim 2, each side plate further comprising an inner surface and the sheave further comparing an outer recess on opposite sides of the sheave about the central opening, the block further comprising a plurality of bearings within each outer recess of the sheave and positioned to engage the inner surface of one of the side plates.

5. The block of claim 1, each of the side plates further comprising a recess adjacent a head of the block through which the mounting line loop extends.

6. The block of claim 5, further comprising a mounting line retention means adjacent the head of the block to releasably secure the mounting line loop within the recesses of the side plates.

7. The block of claim 6, wherein the mounting line retention means comprises a lashing line extending through each of the side plates adjacent the recesses.

\* \* \* \* \*